United States Patent [19]

Kowalski et al.

[11] Patent Number: 5,193,122
[45] Date of Patent: Mar. 9, 1993

[54] HIGH SPEED HALFTONE DETECTION TECHNIQUE

[75] Inventors: Robert P. Kowalski, Campbell; Dan S. Bloomberg, Palo Alto, both of Calif.

[73] Assignee: Xerox Corporation, Rochester, N.Y.

[21] Appl. No.: 621,478

[22] Filed: Dec. 3, 1990

[51] Int. Cl.⁵ ............................................. G06K 9/34
[52] U.S. Cl. ............................................. 382/9; 382/18; 377/45
[58] Field of Search .................. 382/9, 18; 377/45; 375/110, 120

[56] References Cited

U.S. PATENT DOCUMENTS

| | | | |
|---|---|---|---|
| 3,513,468 | 5/1970 | Fluegel | 377/45 |
| 3,551,672 | 12/1970 | Homer, III et al. | 250/375 |
| 3,763,380 | 10/1973 | Homer, III et al. | 377/45 |
| 4,151,485 | 3/1979 | LaFratta | 375/120 |
| 4,385,395 | 5/1983 | Tanaka et al. | 375/110 |
| 4,400,738 | 8/1983 | Tomory et al. | 358/462 |
| 4,414,685 | 11/1983 | Sternberg | 382/9 |
| 4,481,665 | 11/1984 | Ota | 382/48 |
| 4,503,556 | 3/1985 | Scherl et al. | 382/9 |
| 4,513,442 | 4/1985 | Scherl | 382/49 |
| 4,668,995 | 5/1987 | Chen et al. | 358/282 |
| 4,680,780 | 7/1987 | Agoston et al. | 375/120 |
| 4,700,400 | 10/1987 | Ross | 382/27 |
| 4,718,101 | 1/1988 | Ariga et al. | 382/9 |
| 4,722,008 | 1/1988 | Ibaraski et al. | 358/456 |
| 4,740,843 | 3/1988 | De Vagel et al. | 358/298 |
| 4,741,046 | 4/1988 | Matsunawa et al. | 382/9 |
| 4,742,558 | 5/1988 | Ishibashi et al. | 382/56 |
| 4,750,209 | 6/1988 | Shimura et al. | 382/9 |
| 4,760,605 | 7/1988 | David et al. | 382/47 |
| 4,786,976 | 11/1988 | Takao et al. | 358/283 |
| 4,791,679 | 12/1988 | Barski et al. | 382/55 |
| 4,805,031 | 2/1989 | Powell | 358/284 |
| 4,811,115 | 3/1989 | Lin et al. | 358/283 |
| 4,817,186 | 3/1989 | Goolsbey et al. | 382/9 |
| 4,827,330 | 5/1989 | Walsh et al. | 358/280 |
| 4,858,018 | 8/1989 | Tanaka | 358/456 |
| 4,893,188 | 1/1990 | Murakami et al. | 358/456 |
| 4,918,540 | 4/1990 | Ohtani | 358/429 |
| 4,998,122 | 3/1991 | Kanno et al. | 382/50 |

FOREIGN PATENT DOCUMENTS

| | | |
|---|---|---|
| 0287995 | 10/1988 | European Pat. Off. |
| 0288266 | 10/1988 | European Pat. Off. |
| 0308673 | 3/1989 | European Pat. Off. |
| 61-22597 | 4/1986 | Japan |

OTHER PUBLICATIONS

K. Y. Wong et al.; "Document Analysis System"; IBM J. Res. Development; vol. 26, No. 6; Nov., 1982.

Stanley R. Sternberg; "Biomedical Image Processing"; IEEE; Jan. 1983.

Petrol Maragos; "Tutorial on Advances in Morphological Image Processing and Analysis"; Optical Engineering; vol. 26, No. 7; Jul. 1987.

Robert M. Haralick et al.; "Image Analysis Using Mathematical Morphology"; IEEE; vol. PAM1-9, No. 4; Jul. 1987.

Primary Examiner—Leo H. Boudreau
Assistant Examiner—Barry Stellrecht
Attorney, Agent, or Firm—Townsend and Townsend

[57] ABSTRACT

A simple technique for determining and indicating, in real times as an image is scanned, the presence of halftones within a page. in brief, the technique contemplates monitoring a pixel stream, typically on a line basis, determining the proportion of pixel transitions (relative to the overall number of pixel intervals), and controlling the process based on this information. In one embodiment, a numerical value representing such a proportion is compared to a threshold, and a value in excess of the threshold is taken to signify the presence of halftone regions. Based on this, special processing for halftones is enabled or special processing for non-halftone regions is disabled. In a specific hardware embodiment, the pixel monitoring circuitry includes a transition detector (50), an up/down activity counter (52), a threshold selector (55), and a counter controller (57).

20 Claims, 7 Drawing Sheets

In response to a large number of requests, CONSUMER'S UNITED ORGANIZATION has agreed to distribute a summary of its recommendations for labeling non-prescription medicines and medical products. These recommendations are the result of a CUO investigation into the legibility of labels particularly in regard to product description, contents, usage, and safety. This is a pre-publication summary; the full report will be included in the annual CONSUMER'S UNITED REVIEW which should reach you in a few months. In the way of an announcement, CUO is extending its work in labeling practices as applied to home appliances and power tools. Look for our notice of the upcoming report.

*FIG. 6A.*

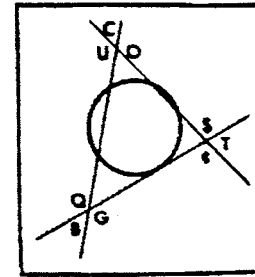
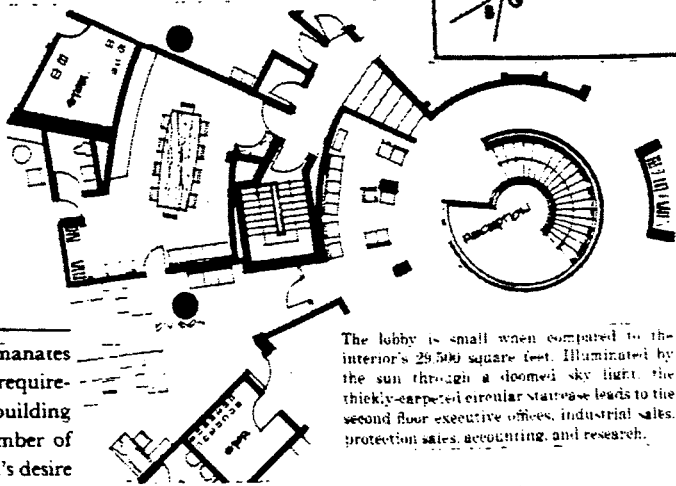

INVEST IN GOOD DESIGN
Harmony of design and function optimizes your financial investment. It improves communications, increases value of real estate, boosts morale, saves operating expenses and enhances a company's image.

MARKETING ALICE COOPER
Sales and Advanced Planning

The unusual configuration of the complex emanates from a number of contributing factors: the requirements of parking as an integral part of the building with consequent problems of relating a number of specific functions and activities and the client's desire The lobby is small when compared to the interior's 29,500 square feet. Illuminated by the sun through a domed sky light, the thickly-carpeted circular staircase leads to the second floor executive offices, industrial sales, protection sales, accounting, and research.

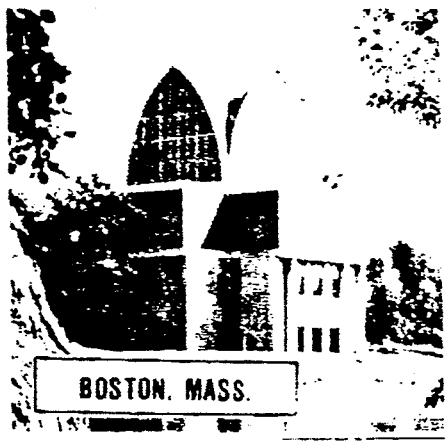
BOSTON, MASS.

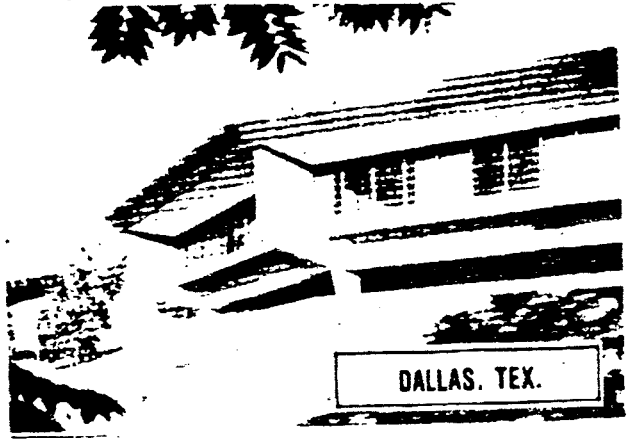
DALLAS, TEX.

FIG. 7A.

HIGH SPEED HALFTONE DETECTION TECHNIQUE

BACKGROUND OF THE INVENTION

The present invention relates generally to image processing, and more specifically to techniques for identifying certain parts of an input image for special processing.

Digital printers, such as those employing laser ROS and ionographic technologies, are used in a wide range of applications. While these printers are fast and efficient, the printing densities used in conjunction with print spot artifacts can cause unwanted or irregular distortions in the final output page. Sometimes, it is necessary to adjust the printer parameters to optimize print quality for one type of region or another. Unfortunately, conditions that might be optimum for halftone printing might be totally unsuitable for regions containing text and line graphics. The focus then shifts to being able to provide information relating to the locations of those areas on the printed page that require different processing from other areas. As an example, the prior art contains many image processing techniques for determining the location of halftone regions from the image itself.

SUMMARY OF THE INVENTION

The present invention provides a technique for determining and indicating the presence of halftones within an image in real time.

In brief, the invention contemplates monitoring a pixel stream, typically on a line basis, determining the pixel transition fraction (the number of transitions divided by the number of pixel intervals), and controlling the process based on this information. In one embodiment, a threshold is set, and a transition fraction in excess of the threshold is taken to signify the presence of halftone regions. Based on this, special processing for halftones is enabled or special processing for non-halftone regions is disabled. In a specific hardware embodiment, the pixel monitoring circuitry includes a transition detector, an up/down activity counter, a threshold selector, and a counter controller.

The activity counter maintains an activity count, preferably constrained to a range, corresponding to the recently detected pixel transition fraction as compared to the threshold. The activity count generally represents whether the pixel transition fraction is above or below the threshold. The transition detector monitors the bit stream and a data clock, and asserts a transition signal corresponding to each cycle for which a bit transition is detected. Transitions on one line or on a number of neighboring lines are monitored and used to derive the transition signal. This signal, among other things, determines whether the activity counter counts upwardly or downwardly.

In one embodiment, the threshold selector provides a mechanism for sampling every $N^{th}$ cycle (where $N \leq 1$) to see whether a transition has occurred in that cycle. In another embodiment, the threshold selector provides a mechanism for determining whether M cycles have elapsed without a transition.

The activity counter is incremented based on a condition relating to the occurrence of transitions and decremented based on a condition relating to the lack of transitions. For example, the count controller causes the activity counter to be incremented for cycles in which a transition is detected, and decremented for sampled cycles in which a transition is not detected (or when M cycles elapse without a transition). The activity counter is typically incremented and decremented by the same amount. The count controller further prevents the counter from being incremented when the count is at the maximum value for the counter and prevents the count from being decremented when the count is at the minimum value.

A further understanding of the nature and advantages of the present invention may be realized with reference to the remaining portions of the specification and the drawings.

BRIEF DESCRIPTION OF THE DRAWINGS

FIGS. 6A and 6B illustrate a first computer simulation of the present invention;

FIGS. 7A-B illustrate a second computer simulation of the present invention.

DESCRIPTION OF SPECIFIC EMBODIMENTS

System Overview

Figure 1A:
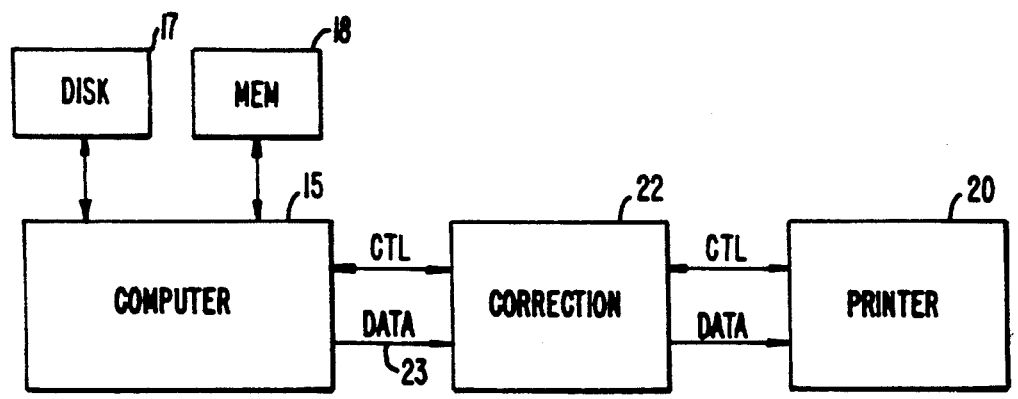
FIGS. 1A-B are block diagrams of a system incorporating the real time halftone detection of the present invention.
Figure 1B:
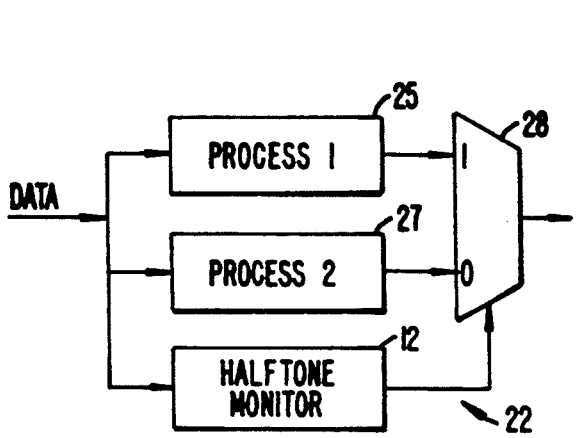

FIGS. 1A-B are block diagrams illustrating a system 10 incorporating a halftone monitor 12 according to the present invention. The halftone monitor asserts a signal when halftones are found to be present.

The halftone monitor operates in conjunction with circuitry for correcting the bit pattern that is communicated to a printer. This can arise in the context of a computer or workstation 15 having associated disk storage 17 and memory 18 operating to print a graphics file on a printer 20. The particular image to be printed could have been composed on the computer, or it could have been scanned from a hard copy. In general, the image may contain regions of differing characteristics. A typical situation is a page having halftone regions, and non-halftone regions containing line graphics and printed text.

Some printers may have known characteristics that require correction to the data prior to printing. In order to account for this possibility, a correction circuit 22 is interposed between the computer's printer port and the printer. Since the correction tends to be printer-specific, the correction circuit is likely to be incorporated into the printer's electronics.

However, a given correction may be appropriate for one type of printed region but not another. For example, a correction required for line graphics could be unnecessary or counterproductive for halftone regions, and vice versa. In a basic embodiment, correction circuit 22 provides for the bit stream, output on a data line 23, to be selectively subjected to one of two correction processes, designated symbolically as process boxes 25 and 27. Process boxes 25 and 27 are matched in delay. To this end, the data is directed along three paths. The first path is through first process box 25 where the data is subjected to a correction suitable for halftone regions. The second path is through second process box 27 where the data is subjected to a correction suitable for non-halftone regions. The third path is to halftone monitor 12.

The signal from the monitor is communicated to the select input of a multiplexer 28 disposed in the first two data paths. The multiplexer is set to select the first path when the output signal from halftone monitor 12 is asserted. It should be noted that one of the paths could be configured to provide no correction. In such a case, the process box in that path would merely provide a delay equal to that encountered by the data in the other path. As a practical matter, it is most likely that efforts will be made to correct non-halftone regions and leave halftone regions alone.

Figure 2:
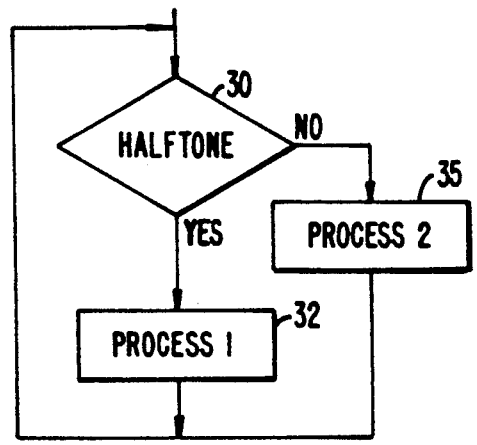
FIG. 2 is a flow diagram illustrating the basic operation of the system.

FIG. 2 is a flow diagram illustrating the manner in which processing of the incoming pixel stream is controlled in view of the information obtained from halftone monitor 12. Initially, a determination is made (step 30) whether the halftone monitor specifies that halftones are present. If halftones are present, the pixel stream is subjected to a first processing option (step 32); if halftones are not present, the pixel stream is subjected to a second processing option (step 35). This is done in real time, so that the transition monitor is constantly controlling the switching between processing options.

Circuit Design

Figure 3:
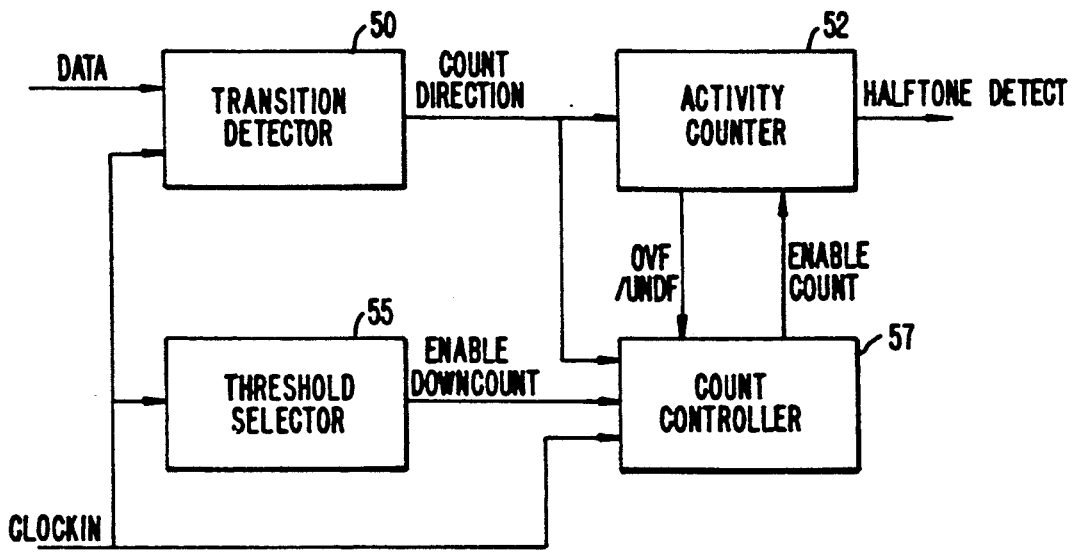
FIG. 3 is a block diagram of the halftone monitor hardware.

FIG. 3 is a block diagram of halftone monitor 12. The halftone monitor operates in a manner akin to sensing the number of pixel transitions that have occurred in a particular window. This corresponds to a transition fraction, and the monitor provides an indication whether the fraction of pixel transitions is greater than or less than a threshold. Monitor 12 can be viewed as comprising four main functional units, namely a transition detector 50, an up/down activity counter 52, a threshold selector 55, and a counter controller 57. The overall operation is as follows.

Transition detector 50 monitors the data bit stream and the data clock, and generates a TransitionDetect signal specifying whether a bit transition has occurred for a given clock cycle. This signal is communicated to activity counter 52 and count controller 57.

Threshold selector 55 largely determines the fraction of bit transitions that will maintain the activity counter at a given point in its range. It operates to provide a sampling signal every N cycles (where N is programmed to set the threshold).

Count controller 57 receives the TransitionDetect signal from transition detector 50 and the sampling signal from threshold selector 55, and determines when activity counter 52 is to be incremented or decremented. The counter provides a signal specifying that the count is at its maximum or minimum value with its range, and count controller 57 uses this information to prevent incrementing beyond the maximum or decrementing below the minimum.

Figure 4:
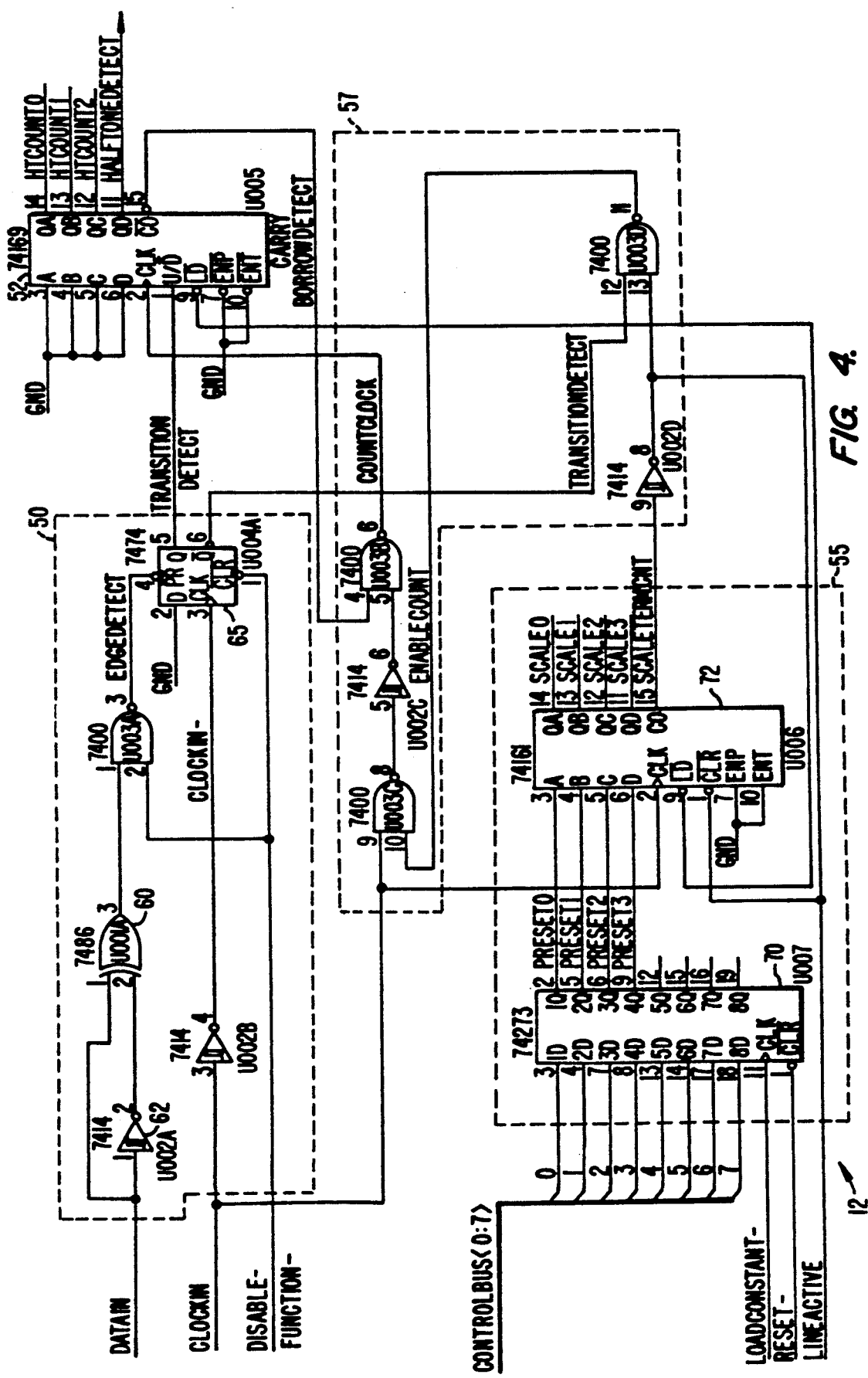
FIG. 4 is a circuit schematic of a representative of embodiment of the halftone monitor.
Figure 5:
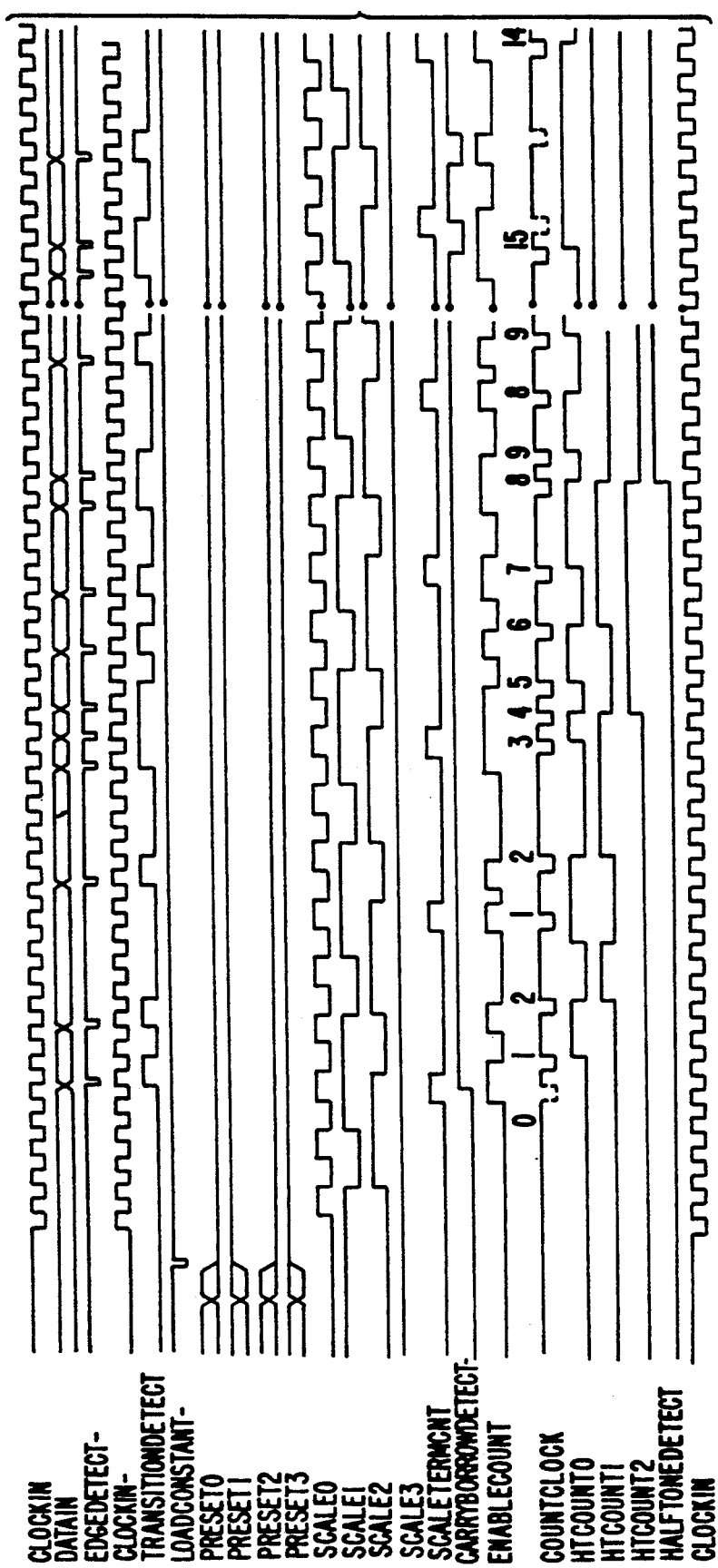
FIG. 5 is a timing diagram illustrating the operation of the circuitry of FIG. 4.

FIG. 4 is a circuit schematic illustrating a specific embodiment of halftone monitor 12. FIG. 5 is a timing diagram illustrating a particular sequence for N=6. The specific circuit responds to transitions on a single-bit data line, which is appropriate for a monochrome printer.

In the case of a gray scale printer with multi-bit pixel data, transitions have to be defined (and possibly handled) differently. One approach is merely to define a transition as having occurred if the multi-bit pixel value changes across a threshold. This would require a comparator, whose single-bit output would be used as input to the circuit. A more refined approach is to define a transition as having occurred if the multi-bit values of two successive pixels differ in absolute value by more than a threshold value. This would require a subtraction circuit and a comparator. The need for a comparator can be avoided if the most significant bit of the pixel value (for the first case) or the most significant bit of the absolute value of the difference (for the second case) is used. This corresponds to a particular threshold.

The incoming data stream is synchronized to a bit clock, referred to as ClockIn, and data transitions occur between rising edges of ClockIn so that the data is valid at the next rising edge of ClockIn. Transition detector 50 includes a dual edge differentiation detection circuit (comprising an exclusive or (XOR) gate 60 and an inventer 62), which provides a signal characterized by a short pulse on each data transition. The width of the pulse is primarily determined by the delay through the invertor on one of the inputs to XOR gate 60. A gated and inverted version of the signal, called EdgeDetect-, is input to a low active set input of a flip-flop 65. The flip-flop has its data input grounded and is clocked by an inverted clock signal ClockIn-. The flip-flop output provides a TransitionDetect signal that is asserted when EdgeDetect- sets the flip-flop, and is withdrawn (clocked to zero) on the next rising edge of ClockIn- unless TransitionDetect- sets the flip-flop. TransitionDetect and its logical complement TransitionDetect- are communicated to other portions of the circuitry.

Activity counter 52 is implemented as an up/down counter whose direction of counting is controlled by TransitionDetect. The counter maintains a count value that is provided at output terminals QA-QD (QD being the most significant bit). The counter is zeroed when a LineActive signal is negated. The counter provides an active low signal CarryBorrowDetect- which is asserted when the counter is in the upcount mode (TransitionDetect asserted) and the counter content is at the maximum value (15 in this case), or when the counter is in its downcount mode (TransitionDetect negated) and the counter is at its minimum value (0 in this case). The counter is clocked by a gated clock signal called CountClock to be described below.

Threshold selector 55 includes a set of flip-flops 70 and a counter 72. Counter 72 is clocked by ClockIn. Flip-flops 70 provide a programmable value Preset(3 .. 0) that is loaded into counter 72. The carryout bit, designated ScaleTermCount is inverted and used to reload the counter. In the particular example shown in the timing diagram, Preset(3..0)=1010 (binary)=10 (decimal). On the cycle where the count reaches 15, the carryout bit is set, and the inverted version provides a low level at the counter's load input. This causes the counter to be reloaded with Preset(3 .. 0) on the next rising edge of ClockIn. Thus, the carryout bit of counter 72 provides a sampling signal ScaleTermCount that is asserted for one cycle of ClockIn every 6th cycle. By loading other preset values from 0 to 15, the sampling signal could be asserted as infrequently as once every 16 cycles or as frequently as once every cycle.

Count controller 57 comprises a network of gates and inverters, and provides the gated clock signal Count-Clock to activity counter 52. When this clock signal is presented, the counter will count up or down, depending on the state of TransitionDetect. The count controller is responsive to ScaleTermCount, CarryBorrowDetect, TransitionDetect-, and ClockIn. Basically, a rising edge capable of clocking the activity counter is provided for either of two conditions. The first is that TransitionDetect is asserted (TransitionDetectlow), in which case the counter is incremented. The second condition is that TransitionDetect not be asserted (TransitionDetect- high) and ScaleTermCount is asserted, in which case the counter is decremented. Both these conditions are subject to the further constraint that CarryBorrowDetect- not be asserted. The most significant bit of counter 52 is used for the HalftoneDetect signal (i.e. asserted when the count is 8 or more).

In this embodiment, the activity counter is incremented and decremented by the same amount (i.e., 1). However, the circuit response to encountering halftones and encountering non-halftones could be tailored by having the activity counter count up and down by different amounts.

Circuit Philosophy

The discussion below utilizes a simplified statistical analysis to clarify some of the function dependencies. It should be understood that the discussion is intended to be heuristic rather than rigorous.

Upcounting occurs in every cycle in which a transition is detected. Downcounting occurs only in sampled cycles (in this case one cycle out of every six) in which no transition occurs. In general, if the probably of a transition is P, and the sampling rate is 1/N, the probability of an upcount in the counter a given cycle is P and the probability of a downcount is $(1-P)/N$. The probability of an upcount will equal the probability of a downcount for $P=1/(N+1)$. Thus, if the fraction of cycles with transitions is lower than $1/N+1$, the activity counter will tend to count down more than up, and thus remain in the lower range of possible count values (since it cannot fall below zero). If the probability is in excess of $1/(N+1)$, the counter will tend to count up more than down, and thus remain in the upper range (since it cannot go above 15). Thus, the count in the activity counter will tend to provide an indication whether the current transition fraction is above or below $1/(N+1)$ or in the particular instance here, $1/(6+1)$ or about 14%. Therefore, a count of 8 or above is a reasonable indicator that the transition fraction is at least about 14%.

The pixel transition fraction monitoring described above can be roughly viewed as measuring the pixel transition fraction within a moving window, and comparing that measured value to a threshold. As noted above, the threshold is determined primarily by the scale factor that is loaded into counter 72. The window width can be understood as follows.

Consider an abrupt change from no transitions to a region having a transition fraction P where P exceeds the threshold, which is $1/(N+1)$. As above, for a given cycle, the probability of an upcount is P and the probability of a downcount is $(1-P)/N$. Therefore the net expected upcount per cycle is the difference $P-(1-P)/N=((N+1)P-1)/N$. If the probability P exceeds the threshold by a fraction f, $P=(1+f)/(N+1)$ and the net expected upcount per cycle is f/N. Thus the effective window width depends on the up/down counter width, the value of N, which determines the threshold, and the encountered transition fraction. For example if the encountered transition fraction were 10% above the threshold, the expected upcount per cycle $=(0.10)/6$ and the expected number of cycles to reach 8 count is 480. On the other hand, if the bit stream changed from no transitions to alternating pixels (P=1), it would only take 8 cycles to register the change, regardless of N.

Computer Simulations of Circuit Operation

FIG. 6A shows a sample document containing halftone regions and printed text. The figure is the result of scanning an input image containing halftones and text at 300 dots per inch and printing it out on a laser printer at a sufficiently low speed that substantially no process artifacts were introduced.

Figure 6B:

FIG. 6B shows a computer simulation of the result of processing the scanned data with the circuitry described above. The computer simulation built a secondary data file containing the 4-bit value of the up/down activity counter for each pixel in the input file bit stream. Each pixel was compared to a threshold, and pixels above the threshold were printed black and those below the threshold were printed white (i.e. not printed). The up/down counter threshold value was 8, which is what was shown in the schematic of FIG. 4 (QD line of counter 52).

In the simulation, a division ratio N=4 was used (compared to N=6 for the timing diagram described above). It should be noted that the threshold N=4 corresponds to a threshold probability or transition fraction of $1/(4+1)=20%$. This corresponds to approximately 5-7 transitions within a 30-34 pixel range. This particular range can detect halftone regions about 3 mm wide and 0.1 mm high on a document scanned of 300 pixels per inch.

The ideal output would be a print which has black areas where halftones are present in the input file, and white areas elsewhere. As seen in FIG. 6B, the black areas are confined to the halftone regions, while the text did not contain enough transitions, and thus did not generate any black. However, the halftone regions are not uniformly black, but contain white areas and apparently gray areas. The white areas correspond to generally solid black regions within the halftone image (people's hair and the shadow regions on the man's chin and in the helmet). Since these are regions of few bit transitions, the counter counts down and remains below 8 (more likely close to 0).

The apparently gray areas, when looked at under magnification, are not gray, but rather consist of closely spaced fine black lines separated by closely spaced fine white line. These occur in very light halftone regions where the black dots are sufficiently sparse or small that no ON pixels (and hence no transitions) are encountered along many lines in the halftone region.

This does not present a problem, since the techniques that might be used to correct non-halftone regions tend to have no effect in regions devoid of pixels in the first place. Similarly any techniques that might possibly be used to correct halftones would already be activated along the black lines where the halftone dots are.

Figure 7B:

FIGS. 7A and 7B show another sample document and computer simulation. The above comments regarding the white and apparently gray areas within the halftone regions apply. It is also noted that the HalftoneDetect signal was asserted in regions of 6-point text since the small characters would be characterized by a relatively high transition fraction. This is not necessarily a problem, since techniques that might be used in correct non-halftone regions so as to smooth out or thicken lines and the like could well be unsuitable for regions of small text where they could cause the white areas within the small characters to artificially fill in.

The apparently gray areas in FIGS. 6B and 7B represent a situation where portions of certain scan lines within halftone areas do not register as halftones since there are few transitions along those lines. Although this is not a problem for most envisioned correction techniques, there may be situations where it would be better if lines such as those did register as halftones. One possible way to achieve this is to base the counting decision at a given point on a scan line upon transition information from a number of neighboring lines.

Figure 8:
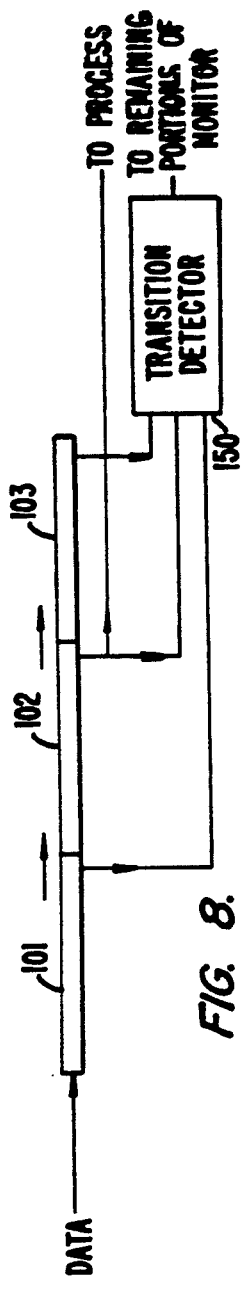
FIG. 8 is a block diagram showing an arrangement for deriving transition information from multiple scan lines.

FIG. 8 is a block diagram showing a buffering arrangement where transition information for the activity counter is derived from three adjacent scan lines. The data is read into a chain of shift registers 101, 102, and 103, each sized to accommodate a line of data. The data is clocked through all the shift registers serially, but is tapped off at the end of each shift register. The data coming from shift register 102 is communicated to the process boxes and to the transition detector (denoted 150) as described in the unbuffered case. However, the data coming from shift registers 101 and 103 represents corresponding pixels on adjacent scan lines. This data is also communicated to transition detector 150. Thus, the transition detector can, and does, determine whether transitions are occurring on any of the scan lines. This information can be used in any of a number of ways to determine whether to specify that a transition has occurred for the purpose of incrementing the activity counter. A logical OR between transitions on the three lines is one possibility; a majority vote is another.

Conclusion

In conclusion it can be seen that the present invention provides an elegant and effective way to monitor halftones in an image. While the above is a complete description of a preferred embodiment of the invention, alternative constructions, modifications, and equivalents may be used.

For example, the system described above has the halftone monitor compare the pixel transition fraction to a threshold, and assert a signal if the fraction is above the threshold. Thus, selection is between two processing options. It is possible to extend this concept to provide three or more processing options, using two or more halftone monitors with respective threshold levels. For the case of three options, a first halftone monitor with a first predetermined threshold level and a second halftone monitor with a second predetermined threshold level are used to monitor the bit stream, and the two HalftoneDetect signals are encoded to select among the three data paths.

Additionally, the embodiment described above uses digital circuitry to sense whether the pixel transition fraction is above or below a threshold. It is possible to provide similar information based primarily on analog circuit measurement. For example, the TransitionDetect signal could be communicated to the input of an integrator, and the integrator output communicated to a comparator. The integrator's time constant relative to the clock would be the primary determinant of the threshold in that the output signal would represent the number of transitions during a period related to the integration time constant.

Furthermore, while the embodiment described above downcounts for sampled cycles for which no transition occurs, it would be possible to use a variation on the downcount criterion. For example, downcounting could be caused to occur whenever a fixed number (M) of contiguous transitionless cycles occur. This could be implemented using a counter (M-counter) that is reset when a transition occurs, and counts until it reaches M if no additional transitions occur. The fixed number M would define a threshold, but would tend to be different from the number N described above. Variations within this downcount criterion include requiring an additional M transitionless cycles before downcounting (i.e., reset the M-counter when it reaches M, so that only one downcount occurs), or allowing downcounts to occur for every transitionless cycle beyond M transitionless cycles (i.e., don't reset the M-counter until a transition occurs).

Therefore, the above description and illustrations should not be taken as limiting the scope of the invention which is defined by the claims.

What is claimed is:

1. A method of processing a digital image presented as a serial bit stream representing lines of pixels in the image, comprising the steps of:
    monitoring the bit stream;
    maintaining a count within a predetermined range;
    incrementing the count based on a condition relating to the occurrence of a transition;
    decrementing the count based on a condition relating to the lack of transitions;
    specifying which one of at least two numerical ranges the count falls; and
    subjecting the bit stream to one set of a number of sets of operations, each set of which corresponds to a respective numerical range, wherein at least two sets are different from each other, the one set corresponding to the specified numerical range.

2. The method of claim 1 wherein at least one of said sets subjects the bit stream to delay without modification.

3. The method of claim 1 wherein said subjecting step comprises:
    the substeps, carried out in parallel, of subjecting the bit stream to each of the number of sets of operations to generate a corresponding number of resultant bit streams; and
    the substep of selecting the resultant bit stream that corresponds to the specified numerical range.

4. The method of claim 1 wherein the condition relating to the occurrence of a transition and the condition relating to the lack of transitions are based on transitions on a single line.

5. The method of claim 1 wherein the condition relating to the occurrence of a transition and the condition relating to the lack of transitions are based on transitions on a plurality of lines.

6. The method of claim 1 wherein said incrementing step comprises:
    incrementing the count for each clock cycle during which a transition of the bit stream is detected.

7. The method of claim 1 wherein said decrementing step comprises the substeps of:

sampling every $N^{th}$ cycle of the bit clock, where $N \leq 1$; and decrementing the count for every sampled cycle of the bit clock in which not transition of the bit stream occurs;

whereupon the value of the count represents the proportion of bit transitions relative to a threshold that depends on N.

8. The method of claim 1 wherein said condition relating to the lack of transitions is that there are no transitions for M contiguous cycles, where $M \leq 1$.

9. A method of processing a serial bit stream characterized by a bit clock, comprising the steps of:

maintaining a count within a predetermined range;

incrementing the count based on a condition relating to the occurrence of a transition;

sampling every $N^{th}$ cycle of the bit clock, where $N \leq 1$; and decrementing the count for every sampled cycle of the bit clock in which no transition of the bit stream occurs;

whereupon the value of the count represents the proportion of bit transitions relative to a threshold that depends on N, 10. The method of claim 9 wherein said incrementing step comprises:

incrementing the count for each clock cycle during which a transition of the bit stream is detected.

11. Apparatus for processing a digital image presented as a data stream representing lines of pixels in the image, comprising:

means for directing the data stream along first and second parallel paths;

means, disposed in said first and second paths for subjecting the data to respective first and second sets of operations, the first set being intended for halftone regions and the second set being intended for non-halftone regions;

means for monitoring the data stream;

transition means, responsive to the data stream, for detecting bit transitions;

means for storing a count;

means, coupled to said transition means and responsive to the data clock, for incrementing said count based on a condition relating to the occurrence of a transition;

means, coupled to said transition means, for decrementing said count based on a condition relating to the lack of transitions; and means, responsive to said count for selecting data from the first or second path, depending on the value of said count.

12. The apparatus of claim 11 wherein one of said sets of operations does not modify the data in its respective path.

13. The apparatus of claim 1 wherein said monitoring means operates on a single portion of the data stream at a given time.

14. The apparatus of claim 11 wherein said monitoring means operates on a plurality of discrete portions of the data stream at a given time.

15. The apparatus of claim 11 wherein said incrementing means comprises means for incrementing said count each count cycle for which a transition is detected.

16. The apparatus of claim 11 wherein said decrementing means comprises:

means for selecting a subset of the clock cycles; and means, coupled to said transition means, for decrementing said count every selected cycle for which no transition is detected.

17. The apparatus of claim 11 wherein said incrementing means increments by the same amount as said decrementing means decrements.

18. The apparatus of claim 11, and further comprising:

means defining predetermined maximum and minimum values for said count; and constraint means for preventing said count from being incremented when it is at said predetermined maximum value and from being decremented when it is at said predetermined minimum value.

19. Apparatus for monitoring a bit stream characterized by a bit clock comprising:

transition means, responsive to the bit stream and to the bit clock, for specifying for each cycle of the bit clock whether a transition in the bit stream has occurred for that cycle;

a clock divider, responsive to the bit clock, for providing a signal that is asserted every $N^{th}$ clock cycle where $N \geq 1$;

means, responsive to the bit clock, for generating a gated clock signal, said gated clock signal being asserted only (a) for each cycle that said transition means specifies a transition, and (b) for each cycle that the clock divider signal is asserted and the transition detection means specifies no transition; and an up/down counter, for incrementing a count in response to said gated clock signal when said transition means specifies a transition and for decrementing the count in response to said gated clock signal when said transition means specifies no transition.

20. The apparatus of claim 19, and further comprising:

means defining predetermined maximum and minimum values for said count; and constraint means for preventing said count from being incremented when it is at said predetermined maximum value and from being decremented when it is at said predetermined minimum value.

* * * * *